United States Patent
Yang et al.

(10) Patent No.: US 9,706,134 B2
(45) Date of Patent: Jul. 11, 2017

(54) EFFICIENT RECORDING OF TRANSACTION VIDEO

(71) Applicant: Dialogic Corporation, Montreal (CA)

(72) Inventors: Kyeong Ho Yang, Freehold, NJ (US); Jon Robert Montana, Cedar Grove, NJ (US)

(73) Assignee: Dialogic Corporation, Montreal (CA)

( * ) Notice: Subject to any disclaimer, the term of this patent is extended or adjusted under 35 U.S.C. 154(b) by 0 days.

(21) Appl. No.: 15/190,351

(22) Filed: Jun. 23, 2016

(65) Prior Publication Data

US 2016/0381318 A1    Dec. 29, 2016

Related U.S. Application Data

(60) Provisional application No. 62/183,821, filed on Jun. 24, 2015.

(51) Int. Cl.
| | |
|---|---|
| *H04N 7/14* | (2006.01) |
| *H04N 5/262* | (2006.01) |
| *H04N 7/15* | (2006.01) |
| *H04N 5/917* | (2006.01) |
| *H04N 5/45* | (2011.01) |
| *H04N 5/765* | (2006.01) |

(52) U.S. Cl.
CPC ............ *H04N 5/2628* (2013.01); *H04N 5/45* (2013.01); *H04N 5/765* (2013.01); *H04N 5/917* (2013.01); *H04N 7/147* (2013.01); *H04N 7/15* (2013.01)

(58) Field of Classification Search
CPC ....................................................... H04N 7/14
USPC .......... 348/14.01, 14.12, 14.11, 14.13, 14.07
See application file for complete search history.

(56) References Cited

U.S. PATENT DOCUMENTS

2011/0279628 A1* 11/2011 Khot ...................... H04N 7/152
                                                                 348/14.08

OTHER PUBLICATIONS

Westin, P., et al., "RTP Payload Format for VP8 Video"; Internet Draft by Payload Working Group at Google, Inc., 30 pages, Oct. 4, 2013.

(Continued)

*Primary Examiner* — Olisa Anwah
(74) *Attorney, Agent, or Firm* — BainwoodHuang

(57) ABSTRACT

Systems and methods of recording real-time video transactions between computerized user devices that make more efficient use of the systems' computing resources. Such systems and methods can record real-time video transactions between computerized user devices (e.g., customer client devices, customer service agent devices) by exploiting similarities between (1) video frame data generated by the respective computerized user devices, and (2) video frame data composed by the systems that record the real-time video transactions, without substantially degrading the video quality of the recorded real-time video transactions.

18 Claims, 9 Drawing Sheets

(56) References Cited

OTHER PUBLICATIONS

Wiegand, T., et al., "Overview of the H.264/AVC Video Coding Standard", IEEE Transactions on Circuits and Systems for Video Technology, 13(7):560-576 (2003).
International Telecommunications Union manual ITU-T H.265, Series H: Audiovisual and Multimedia Systems, Infrastructure of audiovisual services—Coding of moving video, High Efficiency Video Coding; 317 pages, Apr. 2013.
Fraunhofer Heinirch Hertz Institute, "High Efficiency Video Coding (HEVC)", retrieved from the internet on Sep. 7, 2016; URL: https://hevc.hhi.fraunhofer.de/; 2 pages.
The WebM Project, "VP9 Video Codec", retrieved from the internet on Sep. 7, 2016; URL:http://www.webmproject.org/vp9/; 3 pages.

* cited by examiner

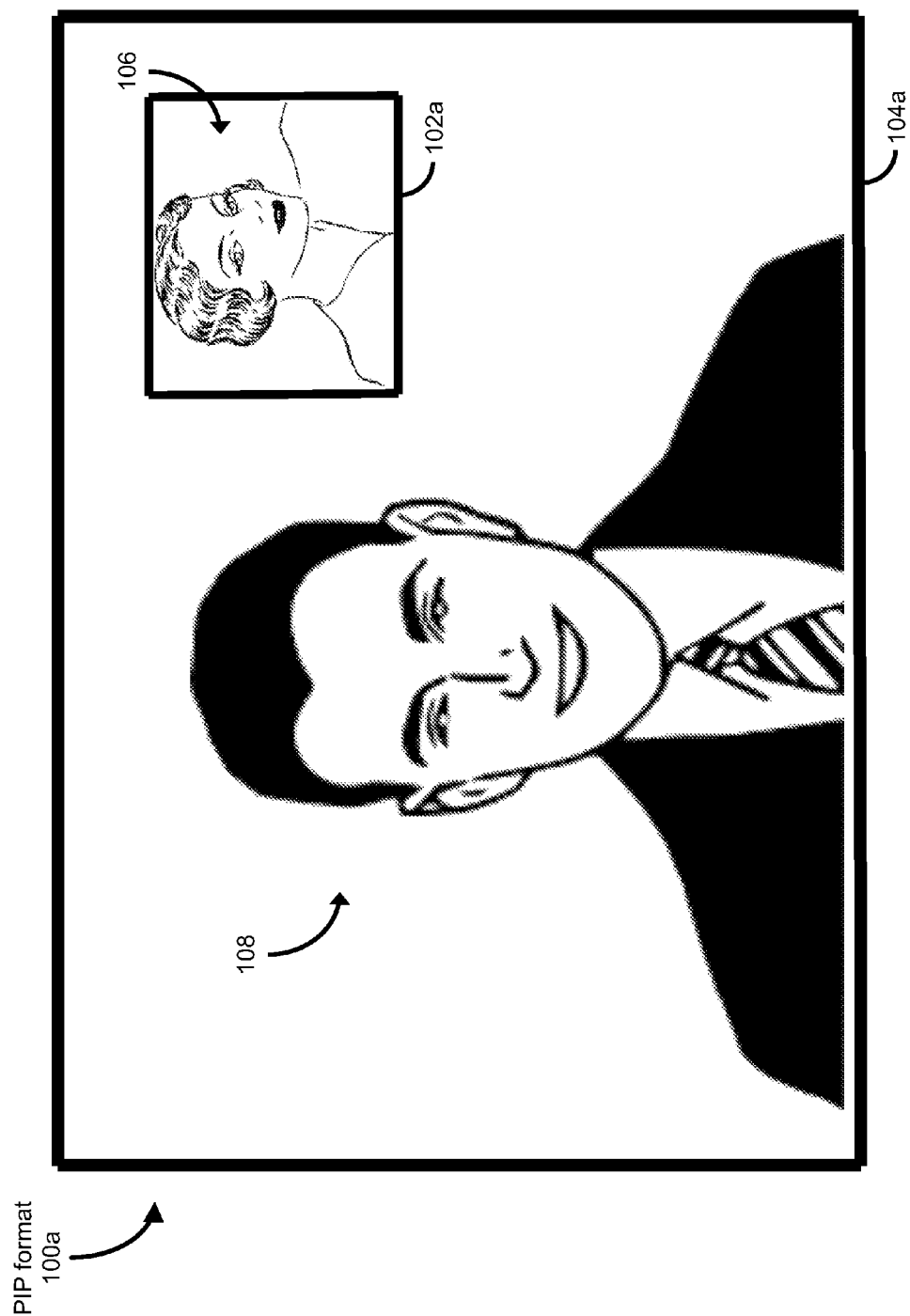

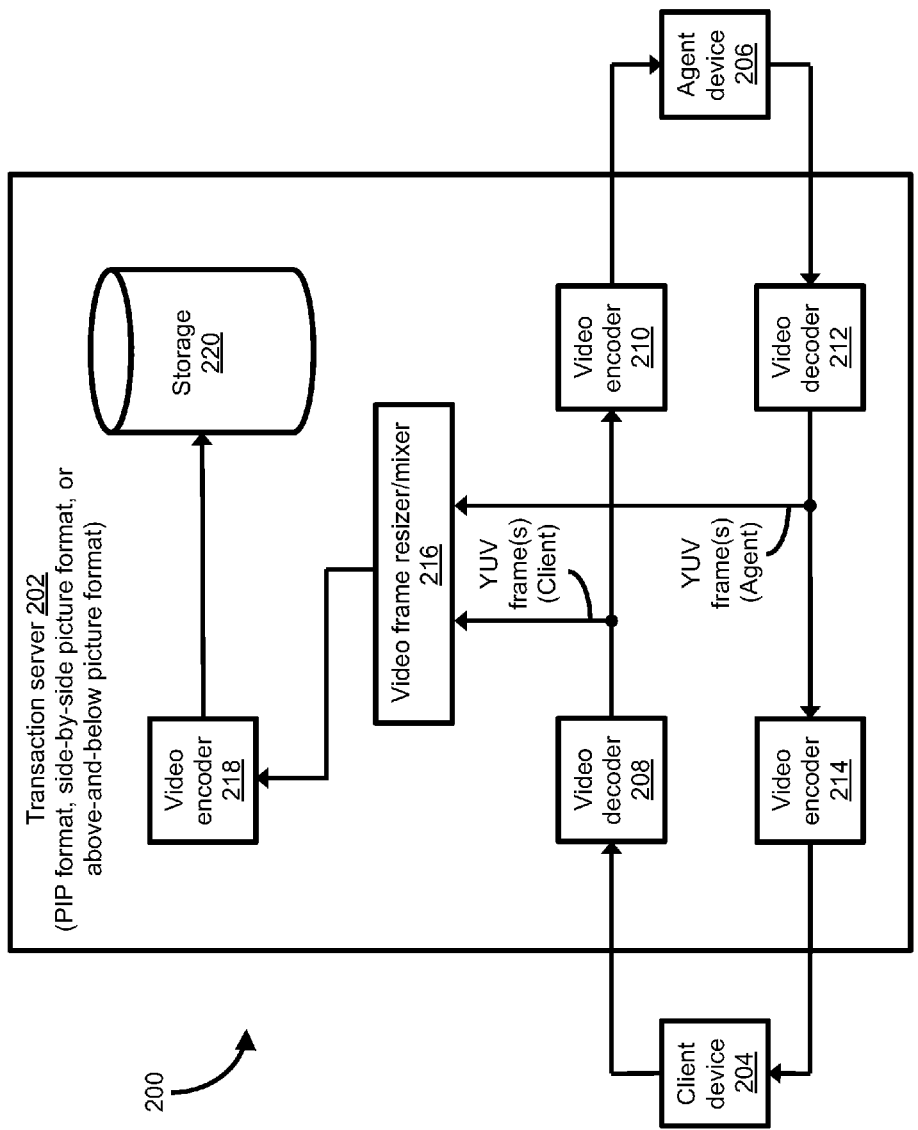
*Fig. 2 – Prior art*

EFFICIENT RECORDING OF TRANSACTION VIDEO

CROSS REFERENCE TO RELATED APPLICATIONS

This application claims benefit of the priority of U.S. Provisional Patent Application No. 62/183,821 filed Jun. 24, 2015 entitled EFFICIENT RECORDING OF TRANSACTION VIDEO.

TECHNICAL FIELD

The present application relates generally to systems and methods of recording video, and more specifically to systems and methods of recording video of real-time transactions between computerized user devices, such as customer client devices and customer service agent devices.

BACKGROUND

In recent years, real-time video communications have increased in popularity due in no small part to advancements made in video compression technologies and the wide deployment of broadband networks. Such real-time video communications capabilities have, in turn, led to the increased availability of video services in many enterprise and customer support applications. One such application involves the recording of video of real-time transactions between computerized user devices, such as customer client devices (also referred to herein as the "client device(s)") and customer service agent devices (also referred to herein as the "agent device(s)"). For example, such agent devices might be located in a call center of a customer service organization (e.g., insurance, banking). In such an application, it is often desirable to record an entire real-time video transaction, tracking the audio and video produced by both the client device and the agent device in a single video file. Such recording of an entire real-time video transaction between a client device and an agent device can serve as a valuable resource for a customer service organization, allowing the organization to review and evaluate the level or quality of customer experience, service quality assurance, liability protection, etc., as well as to capture an accurate record of a complete customer/agent interaction.

In a conventional video transaction recording system, compressed video bitstreams produced by computerized user devices (e.g., a client device, an agent device) are typically received and decoded to YUV video frames, and then provided to a video mixer, which mixes the decoded YUV video frames in different regions of the same video frame. The mixed video frames are then typically encoded, and a video file containing the encoded bitstream of the mixed video frames is recorded in a suitable video storage area. Such a conventional video transaction recording system has drawbacks, however, in that the need for further encoding of the mixed video data prior to storing the video file in the video storage area can result in an inefficient utilization of a system's computing resources.

It would therefore be desirable to have improved systems and methods of recording real-time video transactions between computerized user devices that make more efficient use of the systems' computing resources, without substantially degrading the video quality of the recorded real-time video transactions.

SUMMARY

In accordance with the present application, improved systems and methods of recording real-time video transactions between computerized user devices are disclosed that make more efficient use of the systems' computing resources. Such systems and methods can record real-time commercial or non-commercial video transactions between computerized user devices (e.g., customer client devices, customer service agent devices) by exploiting similarities between (1) video frame data generated by the respective computerized user devices, and (2) video frame data composed by the systems that record the real-time video transactions, without substantially degrading the video quality of the recorded real-time video transactions.

In a first aspect, a system for recording real-time video transactions between a customer client device (also referred to herein as a/the "client device") and a customer service agent device (also referred to herein as an/the "agent device") can record such real-time video transactions using a picture-in-picture (PIP) format. In this first aspect, the system includes a client device, an agent device, and a transaction server communicably coupled between the client device and the agent device. In an exemplary aspect, one or both of the client device and the agent device can communicate with the transaction server over at least one network, such as the Internet. In a further exemplary aspect, the agent device and the transaction server can be co-located within a call center of a customer service organization (e.g., insurance, banking), or any other suitable location where real-time video transactions may be handled. The transaction server includes a first video decoder, a first video encoder, and a video frame resizer. The first video decoder is operative to receive, from the agent device, a first compressed video bitstream (also referred to herein as a/the "first video bitstream") corresponding to at least one agent video frame (e.g., a YUV frame), to decode the first video bitstream to obtain data of the agent video frame, and to provide the data of the agent video frame to the first video encoder and the video frame resizer. For example, the agent video frame from the agent device can include an image of a first human user operating the agent device (such a first human user also referred to herein as an/the "agent"). The first video encoder is operative to encode the data of the agent video frame, and to provide the encoded data of the agent video frame in a bitstream to the client device for viewing of the agent video frame by a second human user operating the client device (such a second human user also referred to herein as a/the "client"). The transaction server further includes a second video decoder, a transaction video encoder, and a video storage area. The second video decoder is operative to receive, from the client device, a second compressed video bitstream (also referred to herein as the "second video bitstream") corresponding to at least one client video frame (e.g., a YUV frame), to decode the second video bitstream to obtain data of the client video frame, and to provide the data of the client video frame to the transaction video encoder. For example, the client video frame from the client device can include an image of the client. The transaction video encoder is operative to encode the data of the client video frame, and to provide the encoded data of the client video frame in a bitstream to the agent device for viewing of the client video frame by the agent. The video frame resizer is operative to resize a predetermined area of the agent video frame including the image of the agent, thereby generating a PIP video frame with the agent's image that can be partially overlaid on top of the client video frame including the image of the client. The video frame resizer is further operative to provide data of the PIP video frame (also referred to herein as the "PIP overlay data") with the agent's image to the transaction video encoder. The transaction video encoder is further operative to encode the data of the client video frame with the PIP overlay data, and to provide an encoded client video frame/PIP overlay data bitstream for storage in a video file in the video storage area.

In a second aspect, a system for recording real-time video transactions between a client device and an agent device can record such real-time video transactions using a side-by-side picture format or an above-and-below picture format. In this second aspect, the system includes a client device, an agent device, and a transaction server communicably coupled between the client device and the agent device. As in the first aspect, one or both of the client device and the agent device can communicate with the transaction server over at least one network, such as the Internet. Further, the agent device and the transaction server can be co-located within a call center of a customer service organization (e.g., insurance, banking), or any other suitable location where real-time video transactions may be handled. The transaction server of the second aspect includes a first video decoder, a first video encoder, and a transaction video generator. The first video decoder is operative to receive, from the agent device, a first video bitstream corresponding to at least one agent video frame (e.g., a YUV frame), to decode the first video bitstream to obtain data of the agent video frame, and to provide the data of the agent video frame to the first video encoder. For example, the agent video frame from the agent device can include an image of the agent. The first video encoder is operative to encode the data of the agent video frame, and to provide the encoded data of the agent video frame in a bitstream to the client device for viewing of the agent video frame by the client. The first video encoder is further operative to generate macroblock (MB) data (e.g., MB coding mode(s), intraframe prediction mode(s), motion vector(s), quantization parameter(s), quantized coefficient (s)) of the agent video frame during the encoding process, and to provide the MB data of the agent video frame to the transaction video generator. The transaction server of the second aspect further includes a second video decoder, a second video encoder, and a video storage area. The second video decoder is operative to receive, from the client device, a second video bitstream corresponding to at least one client video frame (e.g., a YUV frame), to decode the second video bitstream to obtain data of the client video frame, and to provide the data of the client video frame to the second video encoder. For example, the client video frame from the client device can include an image of the client. The second video encoder is operative to encode the data of the client video frame, and to provide the encoded data of the client video frame in a bitstream to the agent device for viewing of the client video frame by the agent. The second video encoder is further operative to generate MB data (e.g., MB coding mode(s), intraframe prediction mode(s), motion vector(s), quantization parameter(s), quantized coefficient(s)) of the client video frame during the encoding process, and to provide the MB data of the client video frame to the transaction video generator. The transaction video generator is operative to arrange the MB data of the agent video frame and the MB data of the client video frame such that the respective agent and client video frames appear together in the side-by-side picture format, or in the above-and-below picture format, in a combined video frame, to perform entropy encoding on the arranged MB data of the agent video frame and the client video frame, and to provide a combined video frame data bitstream for storage in a video file in the video storage area.

By providing, in accordance with the first aspect, a transaction server with a transaction video encoder operative, at least, (1) to encode data associated with a video frame from a client device, (2) to encode data associated with a PIP video frame originating from an agent device, the PIP video frame being partially overlaid on top of the video frame from the client device, (3) to provide an encoded video frame/PIP overlay data bitstream to a video storage area for storage in a video file within the video storage area, and (4) to reuse at least the encoded data associated with the video frame from the client device for transmission of an encoded client video frame data bitstream to the agent device for viewing of the video frame from the client device at the agent device, more efficient use of a system's computing resources for recording real-time video transactions can advantageously be achieved.

Moreover, by providing, in accordance with the second aspect, a transaction server with a transaction video generator operative, at least, (1) to arrange MB data of a video frame from a client device and MB data of a video frame from an agent device such that the respective video frames appear together in a side-by-side or above-and-below picture format in a combined video frame, (2) to perform entropy encoding on the arranged MB data associated with the video frames from the client device and the agent device, and (3) to provide a combined video frame data bitstream to a video storage area for storage in a video file within the video storage area, more efficient use of a system's computing resources for recording real-time video transactions can, likewise, advantageously be achieved.

Other features, functions, and aspects of the invention will be evident from the Detailed Description that follows.

BRIEF DESCRIPTION OF THE DRAWINGS

The accompanying drawings, which are incorporated in and constitute a part of this specification, illustrate one or more embodiments described herein, and, together with the Detailed Description, explain these embodiments. In the drawings:

FIG. 1a is an illustration of an exemplary picture-in-picture (PIP) format for recording real-time video transactions between computerized user devices, including an exemplary first video frame resized as a PIP video frame partially overlaid on top of an exemplary second video frame;

FIG. 2 is a block diagram of a conventional system for recording real-time video transactions between computerized user devices, using the PIP format of FIG. 1a, the side-by-side picture format of FIG. 1b, or the above-and-below picture format of FIG. 1c;

Figure 3A:
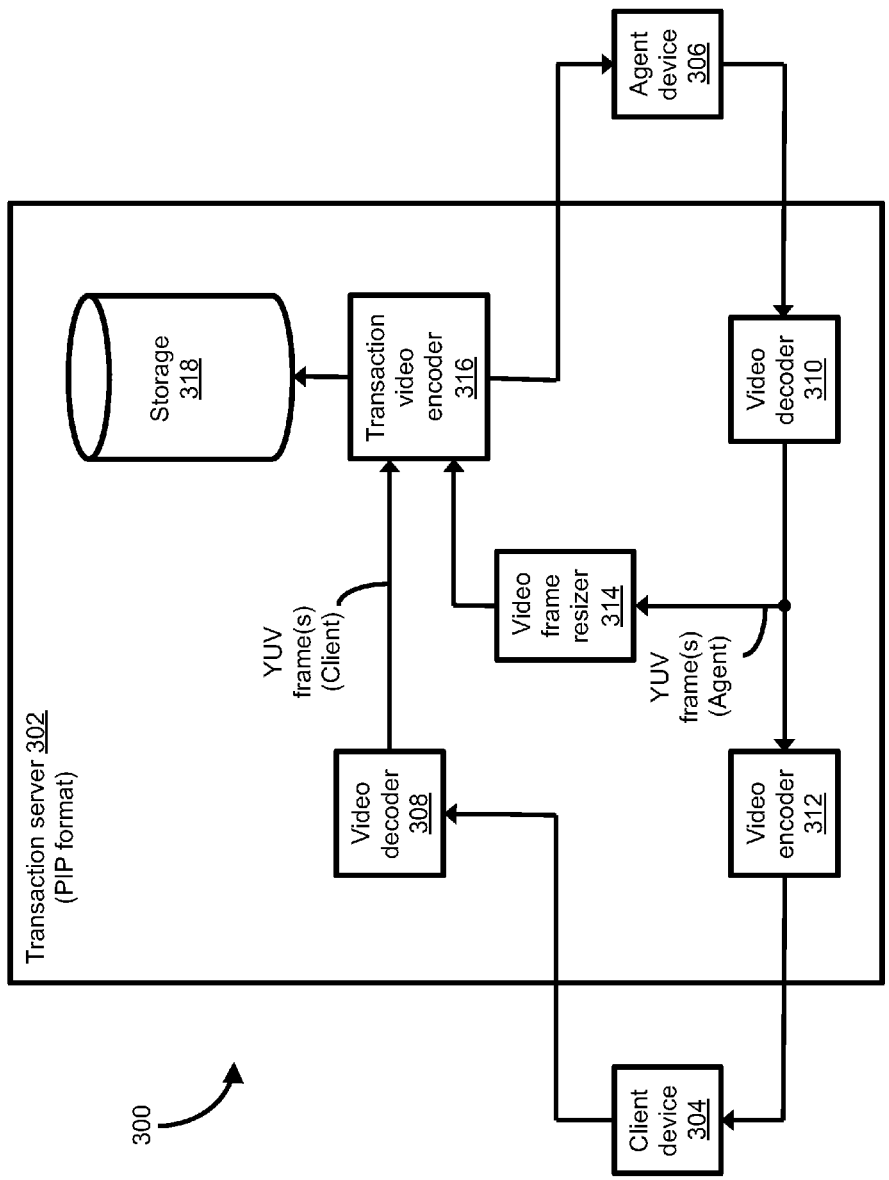
FIG. 3a is a block diagram of a first embodiment of an exemplary system for recording real-time video transactions between computerized user devices using the PIP format of FIG. 1a, in accordance with the present application.
Figure 4:
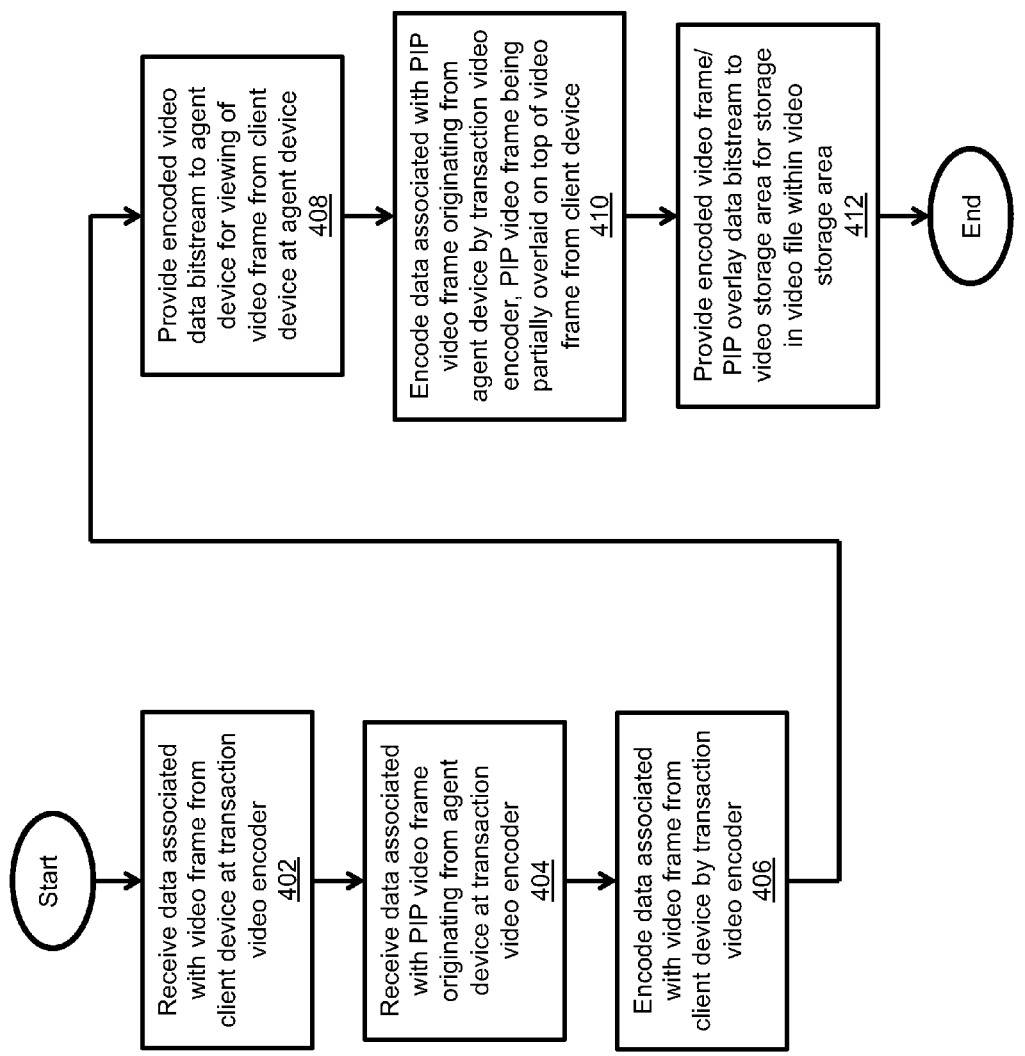
Figure 5:
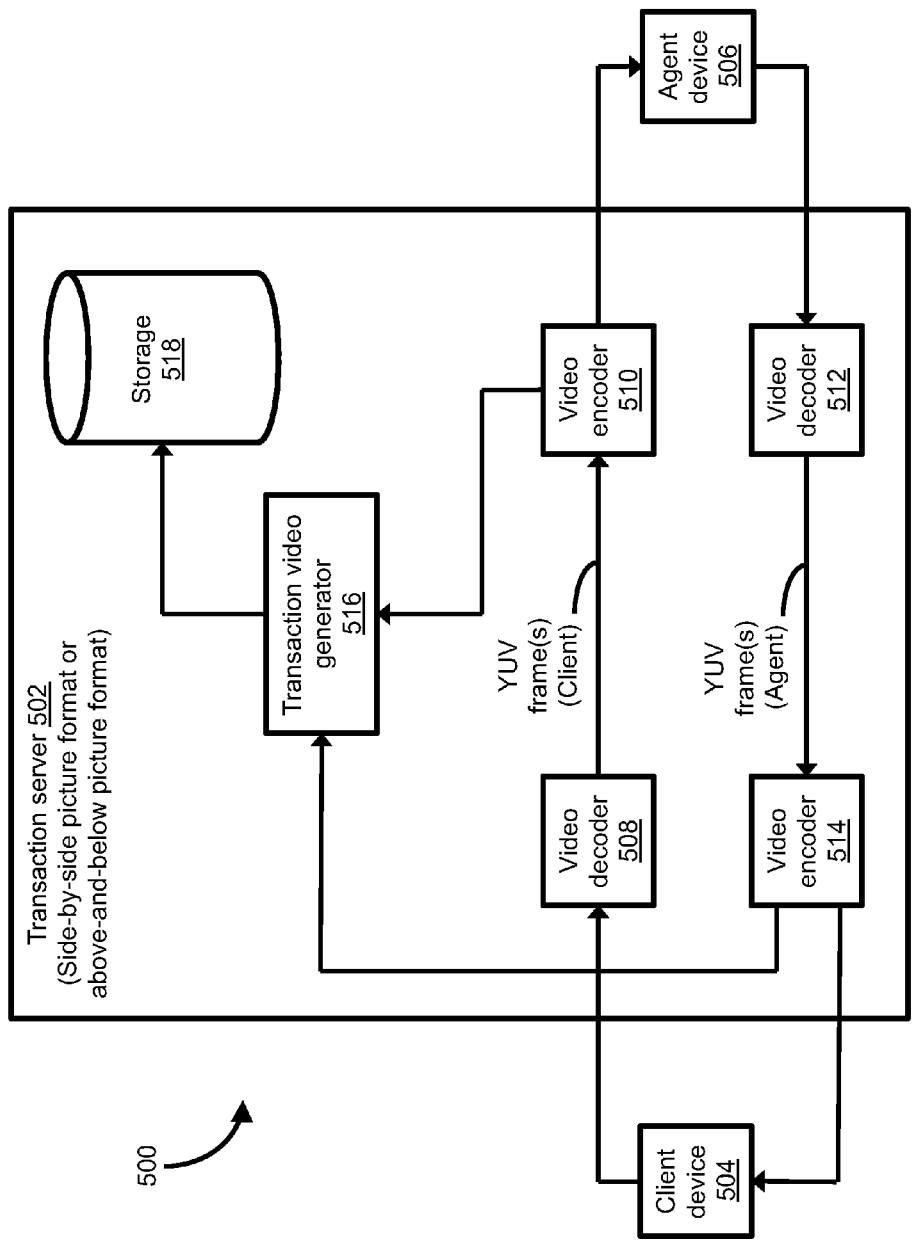
Figure 6:
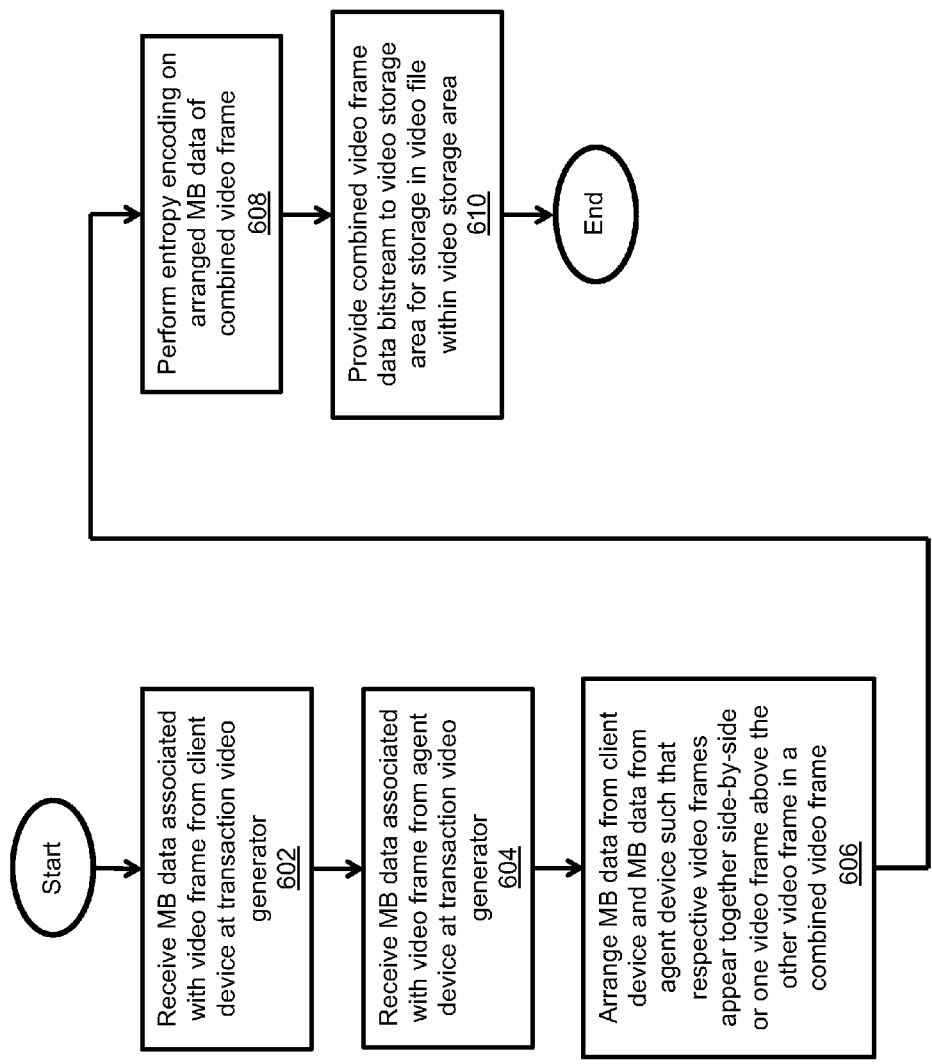

1a, such regions being illustrated for use in describing the operation of the system of FIG. 3a;

FIG. 4 is a flow diagram illustrating an exemplary method of operating the system of FIG. 3a;

FIG. 5 is a block diagram of a second embodiment of an exemplary system for recording real-time video transactions between computerized user devices using the side-by-side picture format of FIG. 1b or the above-and-below picture format of FIG. 1c, in accordance with the present application; and FIG. 6 is a flow diagram illustrating an exemplary method of operating the system of FIG. 5.

DETAILED DESCRIPTION

The disclosure of U.S. Provisional Patent Application No. 62/183,821 filed Jun. 24, 2015 entitled EFFICIENT RECORDING OF TRANSACTION VIDEO is hereby incorporated herein by reference in its entirety.

Improved systems and methods of recording real-time video transactions between computerized user devices are disclosed that make more efficient use of the systems' computing resources. Such systems and methods can record real-time commercial or non-commercial video transactions between computerized user devices (e.g., customer client devices, customer service agent devices) by exploiting similarities between (1) video frame data generated by the respective computerized user devices, and (2) video frame data composed by the systems that record the real-time video transactions, without substantially degrading the video quality of the recorded real-time video transactions.

FIG. 1a depicts an exemplary picture-in-picture (PIP) format 100a for recording real-time video transactions between computerized user devices. As shown in FIG. 1a, the PIP format 100a includes an exemplary first video frame 102a resized as a PIP video frame partially overlaid on top of an exemplary second video frame 104a. For example, the PIP video frame 102a can include an image 106 of a first human user (e.g., a customer service agent, or, simply, an agent) who can operate a first computerized user device (e.g., a customer service agent device, or, simply, an agent device). Further, the second video frame 104a can include an image 108 of a second human user (e.g., a client) who can operate a second computerized user device (e.g., a customer client device, or, simply, a client device).

Figure 1B:
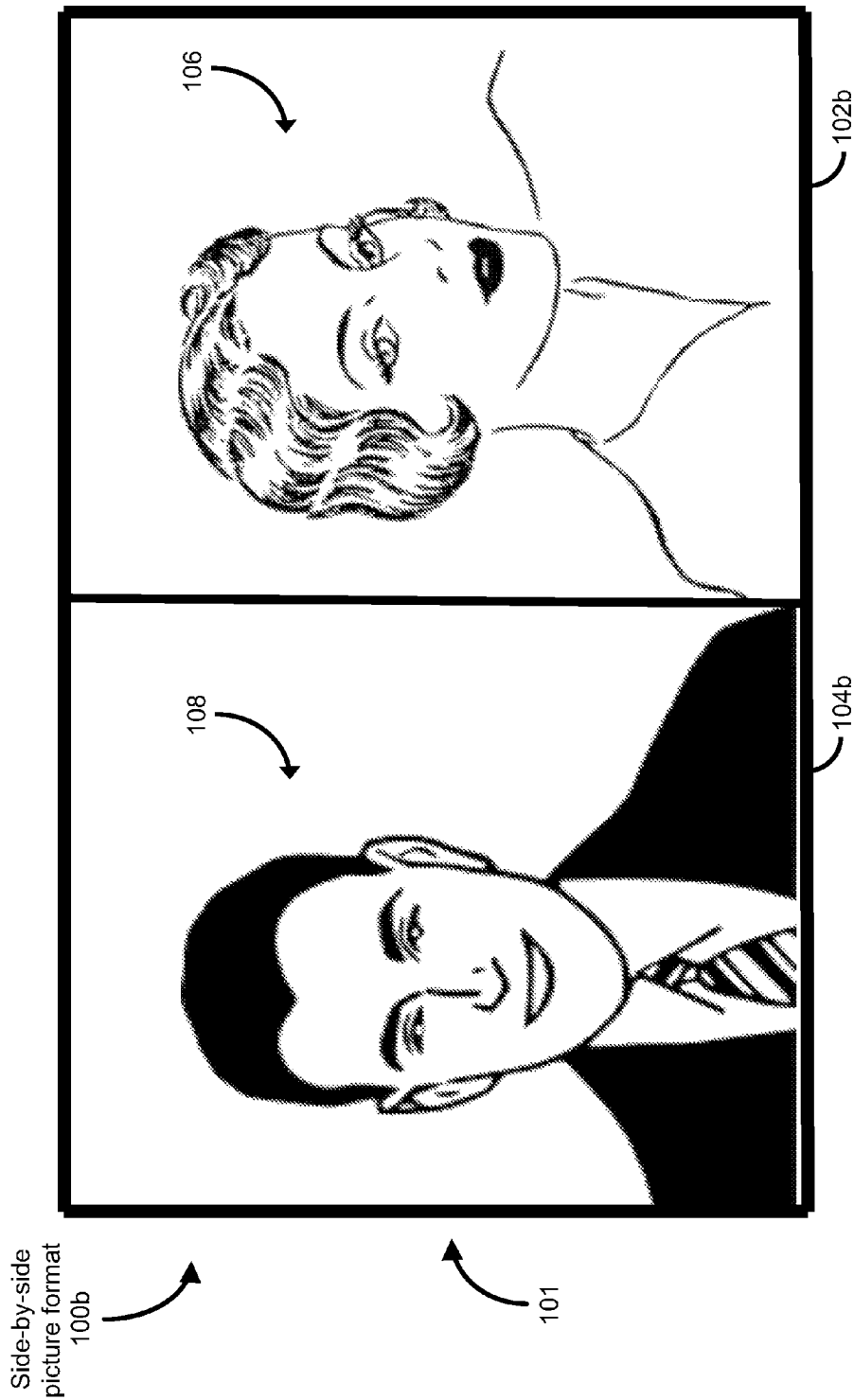
FIG. 1b is an illustration of an exemplary side-by-side picture format for recording real-time video transactions between computerized user devices, in which the first and second video frames of FIG. 1a are arranged to appear side-by-side in an exemplary combined video frame.

FIG. 1b depicts an exemplary side-by-side picture format 100b for recording real-time video transactions between computerized user devices. As shown in FIG. 1b, a first video frame 102b and a second video frame 104b are arranged to appear horizontally side-by-side in an exemplary combined video frame 101, in which the first video frame 102b is disposed on the right side of the combined video frame 101, and the second video frame 104b is disposed on the left side of the combined video frame 101. In an alternative embodiment, the first video frame 102b can be disposed on the left side of the combined video frame 101, and the second video frame 104b can be disposed on the right side of the combined video frame 101.

Figure 1C:
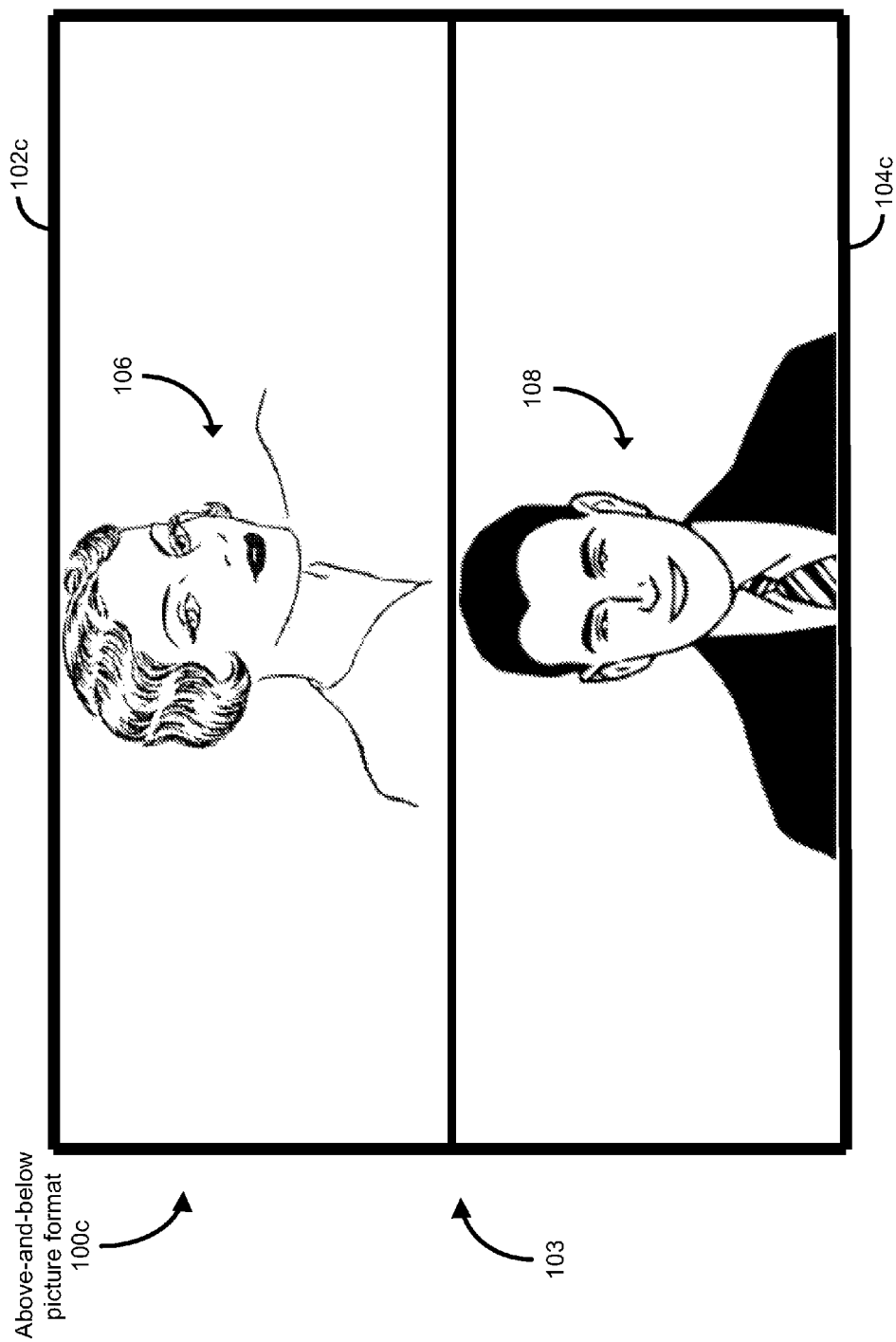
FIG. 1c is an illustration of an exemplary above-and-below picture format for recording real-time video transactions between computerized user devices, in which the first and second video frames of FIG. 1a are arranged to appear one video frame above the other video frame in an exemplary combined video frame.

FIG. 1c depicts an exemplary above-and-below picture format 100c for recording real-time video transactions between computerized user devices. As shown in FIG. 1c, a first video frame 102c and a second video frame 104c are arranged to appear one video frame above the other video frame (i.e., vertically side-by-side) in an exemplary combined video frame 103. As further shown in FIG. 1c, the first video frame 102c is depicted graphically above the second video frame 104c in the combined video frame 103, and the second video frame 104c is depicted graphically below the first video frame 102c in the combined video frame 103. In an alternative embodiment, the first video frame 102c can be depicted graphically below the second video frame 104c in the combined video frame 103, and the second video frame 104c can be depicted graphically above the first video frame 102c in the combined video frame 103.

FIG. 2 depicts a conventional system 200 for recording real-time video transactions between computerized user devices, using the PIP format 100a of FIG. 1a, the side-by-side picture format 100b of FIG. 1b, or the above-and-below picture format 100c of FIG. 1c. As shown in FIG. 2, the conventional system 200 includes a client device 204, an agent device 206, and a transaction server 202 communicably coupled between the client device 204 and the agent device 206. One or both of the client device 204 and the agent device 206 can communicate with the transaction server 202 over at least one network, such as the Internet. Further, one or both of the agent device 206 and the transaction server 202 can be located within a call center of a customer service organization (e.g., insurance, banking), or any other suitable location where real-time video transactions may be handled. The transaction server 202 includes a video decoder 212, a video encoder 214, and a video frame resizer/mixer 216. The video decoder 212 is operative to receive, from the agent device 206, a first compressed video bitstream (also referred to herein as a/the "first video bitstream") corresponding to one or more first video frames, such as a first video frame 102x (e.g., a YUV frame) where "x" can be "a," "b," or "c" (also referred to herein as the "agent video frame") (see FIGS. 1a, 1b, and 1c), to decode the first video bitstream to obtain data of the agent video frame 102x, and to provide the data of the agent video frame 102x to the video encoder 214 and the video frame resizer/mixer 216. For example, the agent video frame 102x from the agent device 206 can include the image 106 (see FIGS. 1a, 1b, and 1c) of the agent. The video encoder 214 is operative to encode the data of the agent video frame 102x, and to provide the encoded data of the agent video frame 102x in a bitstream to the client device 204 for viewing of the agent video frame 102b by the client operating the client device 204. The transaction server 202 further includes a video decoder 208, a video encoder 210, a video encoder 218, and a video storage area 220. The video decoder 208 is operative to receive, from the client device 204, a second compressed video bitstream (also referred to herein as the "second video bitstream") corresponding to one or more second video frames, such as a second video frame 104x (e.g., a YUV frame) where "x" can be "a," "b," or "c" (also referred to herein as the "client video frame") (see FIGS. 1a, 1b, and 1c), to decode the second video bitstream to obtain data of the client video frame 104x, and to provide the data of the client video frame 104x to the video encoder 210 and the video frame resizer/mixer 216. For example, the client video frame 104x from the client device 204 can include the image 108 (see FIGS. 1a, 1b, and 1c) of the client. The video encoder 210 is operative to encode the data of the client video frame 104x, and to provide the encoded data of the client video frame 104x in a bitstream to the agent device 206 for viewing of the client video frame 104x by the agent.

As noted herein, the conventional system 200 (see FIG. 2) for recording real-time video transactions between computerized user devices can use the PIP format 100a of FIG. 1a, the side-by-side picture format 100b of FIG. 1b, or the above-and-below picture format 100c of FIG. 1c. In the event the conventional system 200 uses the PIP format 100a of FIG. 1a, the video frame resizer/mixer 216 is operative to resize a predetermined area of the agent video frame including the agent's image 106, thereby generating the PIP video frame 102a (see FIG. 1a) with the agent's image 106 that can be partially overlaid on top of the client video frame 104a including the client's image 108. The video frame resizer/mixer 216 is further operative to mix data of the PIP video frame 102a (such data of the PIP video frame also referred to herein as the "PIP overlay data") and the data of the client video frame 104a so that the PIP overlay data occupies a predetermined region of the data of the client video frame 104a. The predetermined region of the data of the client video frame 104a can be chosen to assure that the agent's image 106 in the PIP video frame 102a does not obscure the client's image 108 in the client video frame 104a. The video frame resizer/mixer 216 is further operative to provide the data of the client video frame 104a mixed with the data of the PIP video frame 102a to the video encoder 218, which, in turn, is operative to encode the mixed video frame data, and to provide an encoded mixed video frame data bitstream for storage in the same video file within the video storage area 220.

In the event the conventional system 200 (see FIG. 2) uses the side-by-side picture format 100b of FIG. 1b, the video frame resizer/mixer 216 is operative to mix the data of the agent video frame 102b and the data of the client video frame 104b such that the agent video frame 102b and the client video frame 104b appear side-by-side in the combined video frame 101, and to provide data of the combined video frame 101 to the video encoder 218. The video encoder 218 is operative to encode the data of the combined video frame 101, and to provide an encoded combined video frame data bitstream for storage in the same video file within the video storage area 220.

In the event the conventional system 200 (see FIG. 2) uses the above-and-below picture format 100c of FIG. 1c, the video frame resizer/mixer 216 is operative to mix the data of the agent video frame 102c and the data of the client video frame 104c such that the agent video frame 102c and the client video frame 104c appear one video frame above the other video frame in the combined video frame 103, and to provide data of the combined video frame 103 to the video encoder 218. The video encoder 218 is operative to encode the data of the combined video frame 103, and to provide an encoded combined video frame data bitstream for storage in the same video file within the video storage area 220.

It is noted that the conventional system 200 has drawbacks, however, in that the need for further encoding of (1) the mixed video frame data that conforms to the PIP format 100a (see FIG. 1a), (2) the combined video frame data that conforms to the side-by-side picture format 100b (see FIG. 1b), and (3) the combined video frame data that conforms to the above-and-below picture format 100c (see FIG. 1c), prior to storing a resulting video file in the video storage area 220, can frequently lead to an inefficient utilization of a system's computing resources.

FIG. 3a depicts an illustrative embodiment of an exemplary system 300 for recording real-time video transactions between computerized user devices using the PIP format 100a of FIG. 1a, in accordance with the present application. As shown in FIG. 3a, the system 300 includes a client device 304, an agent device 306, and a transaction server 302 communicably coupled between the client device 304 and the agent device 306. In one embodiment, one or both of the client device 304 and the agent device 306 can communicate with the transaction server 302 over at least one network, such as the Internet. In a further embodiment, one or both of the agent device 306 and the transaction server 302 can be located within a call center of a customer service organization (e.g., insurance, banking), or any other suitable location where real-time video transactions may be handled. The transaction server 302 includes a video decoder 310, a video encoder 312, and a video frame resizer 314. The video decoder 310 is operative to receive, from the agent device 306, a first video bitstream corresponding to at least one agent video frame (e.g., a YUV frame), to decode the first video bitstream to obtain data of the agent video frame, and to provide the data of the agent video frame to the video encoder 312 and the video frame resizer 314. For example, the agent video frame from the agent device 306 can include the image 106 (see FIGS. 1a, 1b, and 1c) of the agent. The video encoder 312 is operative to encode the data of the agent video frame, and to provide the encoded data of the agent video frame in a bitstream to the client device 304 for viewing of the agent video frame by the client.

The transaction server 302 further includes a video decoder 308, a transaction video encoder 316, and a video storage area 318. The video decoder 308 is operative to receive, from the client device 304, a second video bitstream corresponding to at least one client video frame, such as the client video frame 104a (see FIG. 1a) (e.g., a YUV frame), to decode the second video bitstream to obtain data of the client video frame 104a, and to provide the data of the client video frame 104a to the transaction video encoder 316. For example, the client video frame 104a from the client device 304 can include the image 108 (see FIGS. 1a, 1b, and 1c) of the client. The transaction video encoder 316 is operative to encode the data of the client video frame 104a, and to provide the encoded data of the client video frame 104a in a bitstream to the agent device 306 for viewing of the client video frame 104a by the agent. The video frame resizer 314 is operative to resize a predetermined area (e.g., a partial area, the entire area) of the agent video frame including the image 106 of the agent, thereby generating the PIP video frame 102a (see FIG. 1a) with the agent's image 106 that can be partially overlaid on top of the client video frame 104a (see FIG. 1a) including the image 108 of the client. The video frame resizer 314 is further operative to provide data of the PIP video frame 102a (such data of the PIP video frame also referred to herein as the "PIP overlay data") with the agent's image 106 to the transaction video encoder 316. Such PIP overlay data can include information (e.g., location information) pertaining to the predetermined region of the data of the client video frame 104a to be occupied by the PIP overlay data in the PIP format 100a (see FIG. 1a). The predetermined region of the data of the client video frame 104a can be chosen to assure that the agent's image 106 in the PIP video frame 102a does not obscure the client's image 108 in the client video frame 104a. It is noted that the size of the predetermined area of the agent video frame, as well as the location of the predetermined region of the client video frame 104a, can be set by a user of the system 300, allowing the user to customize the placement of the PIP overlay data. The transaction video encoder 316 is further operative to encode the data of the client video frame 104a with the PIP overlay data, and to provide an encoded client video frame/PIP overlay data bitstream in the PIP format 100a for storage in a video file within the video storage area 318. The transaction video encoder 316 can further provide, optionally, in place of the bitstream including the encoded data of the client video frame 104a, the encoded client video frame/PIP overlay data bitstream to the agent device 306 for viewing, in real-time by the agent, of the client video frame 104a and the PIP video frame 102a in the PIP format 100a.

Figure 3B:
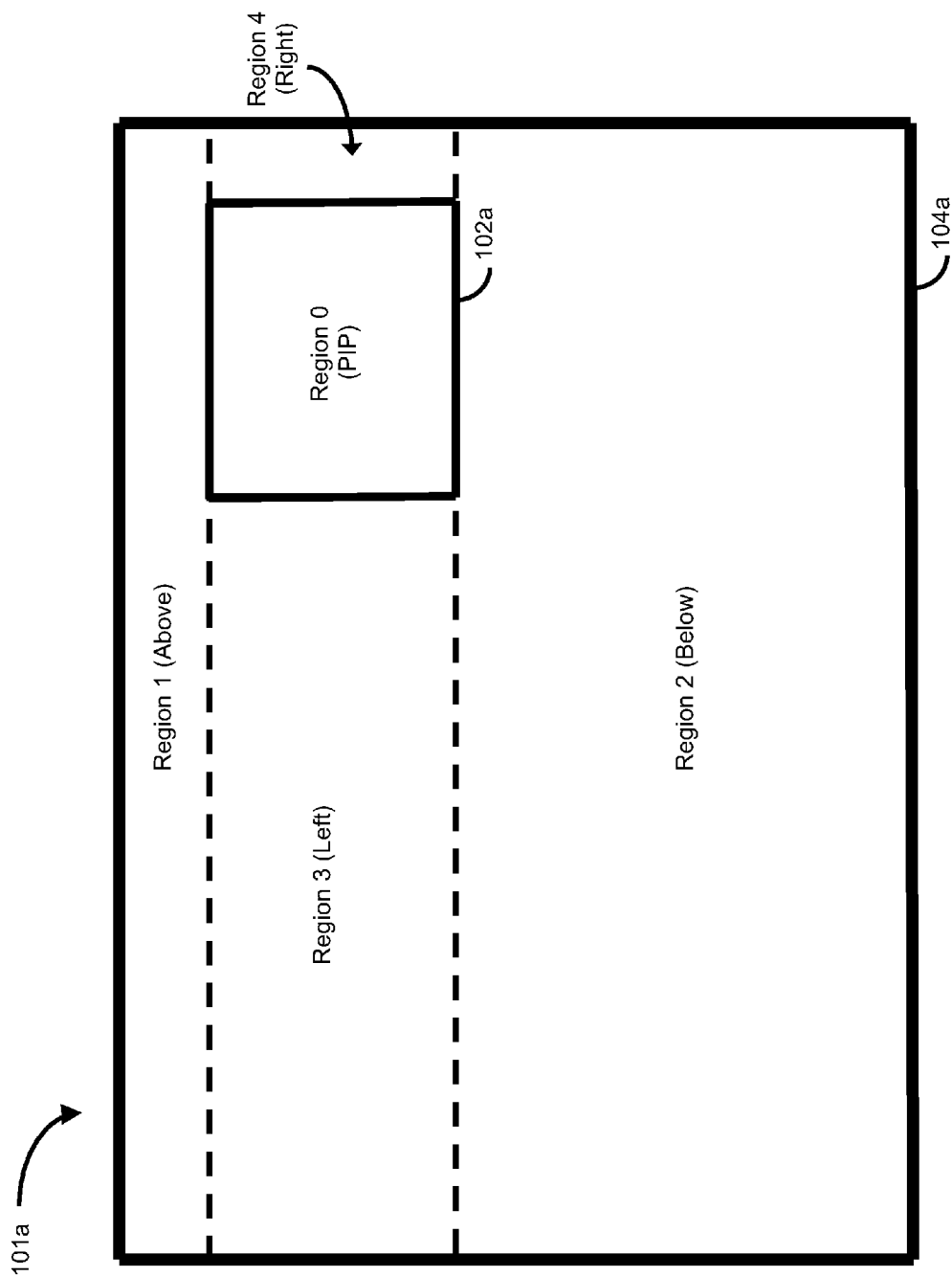
FIG. 3b is an illustration of exemplary regions corresponding to each of the PIP and second video frames of FIG.

FIG. 3b illustrates a plurality of exemplary regions (e.g., Region 0 (PIP), Region 1 (Above), Region 2 (Below), Region 3 (Left), Region 4 (Right)) of the data associated with each of the PIP video frame 102a (see FIG. 1a) and the client video frame 104a (see also FIG. 1a), such regions being illustrated for use in describing the operation of the system 300 of FIG. 3a. For example, Region 0 (PIP) corresponds to the predetermined region of the data of the client video frame 104a occupied by the PIP overlay data. Further, Region 1 (Above) corresponds to the region of the data of the client video frame 104a that would be displayed on a display of a computerized user device above Region 0 (PIP); Region 2 (Below) corresponds to the region of the data of the client video frame 104a that would be displayed on the display of the computerized user device below Region 0 (PIP); Region 3 (Left) corresponds to the region of the data of the client video frame 104a that would be displayed on the display of the computerized user device to the left of Region 0 (PIP); and, Region 4 (Right) corresponds to the region of the data of the client video frame 104a that would be displayed on the display of the computerized user device to the right of Region 0 (PIP). With reference to the encoded client video frame/PIP overlay data bitstream in the PIP format 100a stored in a video file within the video storage area 318, Region 1 (Above), Region 2 (Below), Region 3 (Left), and Region 4 (Right) correspond to portions of the client video frame 104a (see FIG. 1a) that would be viewable by a human user on the display of the computerized user device, and Region 0 (PIP) corresponds to the PIP video frame 102a (see also FIG. 1a) overlaid on top of the client video frame 104a that would be further viewable by the human user on the display of the computerized user device.

The operation of the system 300 will be further understood with reference to the following illustrative example, as well as FIGS. 1a, 3a, and 3b. In this example, Region 0 (PIP) corresponding to the predetermined region of the data of the client video frame 104a occupied by the PIP overlay data, as well as Region 1 (Above), Region 2 (Below), Region 3 (Left), and Region 4 (Right)) corresponding to further respective regions of the data of the client video frame 104a, can be expressed with reference to an exemplary video frame, F, as follows:

$$F=\{R_i | i=0,1,2,3,4\}, \quad (1)$$

in which "$R_i$" represents "Region i" (i=0, 1, 2, 3, 4) in FIG. 3b.

As described herein, the transaction video encoder 316 (see FIG. 3a) is operative (1) to encode the data of the client video frame 104a and provide the encoded data of the client video frame 104a in a bitstream to the agent device 306 for viewing of the client video frame 104a by the agent, and (2) to encode the data of the client video frame 104a with the PIP overlay data and provide the encoded client video frame/PIP overlay data bitstream in the PIP format 100a for storage in a video file within the video storage area 318. With regard to this example, such encoding of the data of the client video frame 104a and/or the PIP overlay data can be performed by the transaction video encoder 316 using the known H.264 coding method. It is noted, however, that the transaction video encoder 316 can alternatively employ the VP8 coding method, or any other suitable coding method.

With further regard to this example, boundaries of Regions 0 (PIP), 1 (Above), 2 (Below), 3 (Left), and 4 (Right) (see FIG. 3b) are aligned along macroblock (MB) boundaries to increase the efficiency of the encoding performed by the transaction video encoder 316 (see FIG. 3a). Further, Regions 0 (PIP), 1 (Above), 2 (Below), 3 (Left), and 4 (Right) each include one or more complete slices (such slice(s) also referred to herein as "NAL unit(s)"), while assuring that all of the MBs in each NAL unit do not require any information from MBs in NAL unit(s) included in adjacent regions of the data of the client video frame 104a. It is noted that, if the transaction video encoder 316 is configured to employ the H.264 coding method, then such NAL units can be formed, line-by-line, in the raster scan order.

Moreover, due to certain constraints associated with the H.264 coding method, error propagation may affect at least one of (1) the encoded data of the client video frame 104a provided in a bitstream to the agent device 306, and (2) the encoded client video frame/PIP overlay data bitstream provided to the video storage area 318. In this example, such error propagation is allowed to be present in the video data bitstream provided to the agent device 306, while avoiding any such error propagation in the video data bitstream provided to the video storage area 318.

The transaction video encoder 316 (see FIG. 3a) is operative to encode, using the H.264 coding method, the data of the client video frame 104a in each of Region 1 (Above) and Region 2(Below) once, and to sharingly use the encoded data of the client video frame 104a, as is, in the respective data bitstreams provided to the agent device 306 and the video storage area 318. It is noted, however, that because NAL units are formed, line-by-line, in the raster scan order while using the H.264 coding method, the transaction video encoder 316 encodes MBs in Region 0(PIP), as well as MBs in Region 3(Left) and in Region 4(Right), line-by-line, in the same NAL unit (or slice). The transaction video encoder 316 therefore may not complete the encoding of the data of the client video frame 104a in Regions 3 (Left) and 4 (Right) until the video frame data in Region 0 (PIP) has been encoded. It is further noted that the video frame data in Region 0 (PIP) can be different in the respective data bitstreams provided to the agent device 306 and the video storage area 318.

In this example, the transaction video encoder 316 shares information pertaining to the slice structure and MB data (e.g., MB coding mode(s), intra-coding mode, inter-coding mode, intraframe prediction modes, motion vector(s), quantization parameter(s), and/or quantized coefficient(s)) associated with Regions 3 (Left) and 4 (Right) between the respective data bitstreams provided to the agent device 306 and the video storage area 318, and forms a set of data, $D_i$, for entropy encoding, which can be expressed, as follows:

$$D_i=\{D_{i,l} | i=3,4 \text{ and } l=0,1,\ldots,L_i-1\}, \quad (2)$$

in which "$D_{3,l}$" (i=3) corresponds to an MB in the data of the client video frame 104a within Region 3(Left), "$D_{4,l}$" (i=4) corresponds to an MB in the data of the client video frame 104a within Region 4(Right), "$L_3$" (i=3) corresponds to the total number of MBs in Region 3(Left), and "$L_4$" (i=4) corresponds to the total number of MBs in Region 4 (Right). The data, $D_{i,l}$, includes the motion vector(s), intraframe prediction mode(s), MB coding mode(s), and/or quantized DCT coefficient(s), etc., for a corresponding MB within Region 3(Left) or 4(Right) to be entropy encoded by the transaction video encoder 316 once the video frame data in Region 0(PIP) becomes ready for such entropy encoding. It is noted that, while performing intra-prediction and/or inter-prediction encoding on the data of the client video frame 104a corresponding to Regions 3 (Left) and 4 (Right), the transaction video encoder 316 does not employ any information from MBs included in Region 0(PIP), due to the video frame data of Region 0(PIP) possibly being different for a current video frame and/or a reference frame(s) in the respective data bitstreams provided to the agent device 306 and the video storage area 318. In other words, while performing motion estimation for Regions 3 (Left) and 4 (Right), the transaction video encoder 316 limits the motion search area so that the motion vector(s) cannot point to pixels in Region 0(PIP). Further, while performing intra-prediction encoding, the transaction video encoder 316 excludes the intraframe prediction mode(s) that use pixels in Region 0(PIP).

As noted herein, the video frame data in Region 0(PIP) can be different in the respective data bitstreams provided to the agent device 306 and the video storage area 318. The transaction video encoder 316 (see FIG. 3a) is therefore further operative to encode, using the H.264 coding method, the video frame data in Region 0(PIP) twice to form two sets of data, $D_{a0}$, $D_{c0}$, for entropy encoding, which can be expressed, as follows:

$$D_{a0} = \{D_{a0,l} | l=0,1, \ldots, L_0-1\}, \text{ and} \quad (3)$$

$$D_{c0} = \{D_{c0,l} | l=0,1, \ldots, L_0-1\}, \quad (4)$$

in which "$D_{a0,l}$" corresponds to an MB in the PIP overlay data (with the agent's image) occupying Region 0(PIP), "$D_{c0,l}$" corresponds to an MB in the data of the client video frame 104a within Region 0(PIP), and "$L_0$" corresponds to the total number of MBs within Region 0 (PIP). It is noted that the transaction video encoder 316 can use information from Region 3 (Left) and/or Region 4(Right) while processing the video frame data in Region 0(PIP).

It is further noted, however, that, while performing deblock filtering across MB boundaries of Regions 0 (PIP) and 3 (Left) and/or MB boundaries of Regions 0 (PIP) and 4 (Right), the transaction video encoder 316 can introduce at least some distortion in the video data bitstream provided to the agent device 306. The deblock filtering is applied to reconstructed video frames within a coding loop, such that the filtered (i.e., reconstructed) video frames are saved and may be used in the reconstruction of other video frames in a video sequence. Such deblock filtering is therefore also referred to as "loop filtering." To reduce such possible distortion due to deblock filtering, the transaction video encoder 316 can perform motion estimation, intra-prediction encoding, and/or inter-prediction encoding for MBs in the data set, $D_{c0}$ (corresponding to the client video frame), using only those picture elements (pixels) that belong to the MBs in the data set, $D_{c0}$. To that end, the transaction video encoder 316 can maintain a small reference frame for use in performing motion estimation/compensation for the MBs in the data set, $D_{c0}$. For example, the size of such a reference frame can correspond to the size of the data set, $D_{c0}$.

Once all of the information for the data sets $D_i$ (corresponding to MBs in the data of the client video frame 104a within Regions 3 (Left) and 4 (Right)) (see equation (2)), $D_{a0}$ (corresponding to the PIP overlay data with the agent's image) (see equation (3)), and $D_{c0}$ (corresponding to the client video frame) (see equation (4)) becomes available, the transaction video encoder 316 can perform, using such information, entropy encoding on the data of the client video frame 104a, as well as the PIP overlay data. For example, the transaction video encoder 316 can perform such entropy encoding using context-adaptive binary arithmetic coding (CABAC), context-adaptive variable length coding (CAVLC), or any other suitable coding. Further, having encoded (1) the data of the client video frame 104a in Region 1 (Above) and in Region 2(Below), (2) the data of the client video frame 104a in Region 3 (Left) and in Region 4 (Right) using the data set, $D_i$, and (3) the PIP overlay data in Region 0(PIP) using the data sets, $D_{a0}$ (corresponding to the PIP overlay data with the agent's image) and $D_{c0}$ (corresponding to the client video frame), the transaction video encoder 316 can provide an encoded client video frame/PIP overlay data bitstream in the PIP format 100a for storage in a video file within the video storage area 318.

As described herein, while performing deblock filtering across MB boundaries of Regions 0 (PIP) and 3 (Left) and/or MB boundaries of Regions 0 (PIP) and 4 (Right), the transaction video encoder 316 can introduce at least some distortion in the video data bitstream provided to the agent device 306. The transaction video encoder 316 can perform such deblock filtering in each NAL unit, using H.264 coding method, to reduce coding artifacts and improve motion compensated prediction. Further, the transaction video encoder 316 can apply such deblock filtering across slices (NAL units), as well as on MBs in the same slice (NAL unit). Because, in this example, such deblock filtering is performed on all of the MBs using the data set, $D_{a0}$ (which includes the data, $D_{a0,l}$, corresponding to the MBs in the PIP overlay data), in order to assure a high level of quality in the recorded real-time video transaction, at least some distortion can be expected in the video data bitstream provided to the agent device 306.

It is noted that the extent of such distortion, due to deblock filtering, in the video data bitstream provided to the agent device 306 can vary across the various regions (e.g., Region 0 (PIP), Region 1 (Above), Region 2 (Below), Region 3 (Left), Region 4 (Right); see FIG. 3b) of the PIP overlay data and/or the data of the client video frame 104a. For example, for MBs in Region 1 (Above) and Region 2 (Below) of the data of the client video frame 104a, such distortion due to deblock filtering may be present in just the MBs bordering Region 0(PIP) of the PIP overlay data. The extent of such distortion in Regions 1 (Above) and/or 2 (Below) may therefore be small, and there may be no additional distortion if the transaction video encoder 316 selects a deblock filtering mode that does not apply deblock filtering across slices (NAL units) (e.g., in the H.264 standard, disable_deblocking_filter_idc is set to 2). For example, the transaction video encoder 316 may select this deblock filtering mode when it requires a larger quantization parameter (i.e., coarser quantization) due to a bandwidth limitation, the complexity of the video, etc. For MBs in Region 3 (Left) of the data of the client video frame 104, such distortion due to deblock filtering may be present in just the MBs that border Region 0 (PIP) of the PIP overlay data, and therefore the extent of such distortion in Region 3 (Left) may likewise be small. The transaction video encoder 316 can form a slice (NAL unit) at the boundary between Region 0 (PIP) and Region 3 (Left), and select a deblock filtering mode that does not apply deblock filtering across slices (NAL units), thereby avoiding additional distortion at the expense of several bits.

For MBs in Region 4 (Right) of the data of the client video frame 104, such distortion due to deblock filtering may also be present in the MBs bordering Region 0(PIP) of the PIP overlay data, however such distortion may be propagated to other MBs in the same MB line of the video frame data. It is noted that such distortion in Region 4(Right) can become relatively high if the transaction video encoder 316 employs a larger quantization parameter (i.e., coarser quantization). Nonetheless, Region 4 (Right) can be configured to be relatively small in size, and therefore the extent of such distortion in Region 4 may also be small. The transaction video encoder 316 can form a slice (NAL unit) at the boundary between Region 0 (PIP) and Region 4 (Right), and select a deblock filtering mode that does not apply deblock filtering across slices (NAL units), thereby avoiding additional distortion at the expense of several bits. In this case, the transaction video encoder 316 can form a slice (NAL unit) with the MBs in Region 4 (Right) together with the MBs in Region 3(Left) in the next macroblock line.

For MBs in Region 0 (PIP) corresponding to $D_{c0}$ (corresponding to the client video frame) (see equation (4)), such distortion due to deblock filtering may be present in all of the MBs bordering Region 1 (Above), Region 2 (Below), Region 3 (Left), and Region 4 (Right) of the data of the client video frame 104, especially when a larger quantization parameter (i.e., coarser quantization) is employed. The extent of such distortion in Region 0 (PIP) may therefore be relatively high. The transaction video encoder 316 can form a slice (NAL unit) at the boundary between Region 0 (PIP) and Region 3 (Left), as well as the boundary between Region 0 (PIP) and Region 4 (Right), and select a deblock filtering mode that does not apply deblock filtering across slices (NAL units), thereby avoiding additional distortion at the expense of several bits.

To reduce error propagation due to deblock filtering in the case where the transaction video encoder 316 does not form a slice (NAL unit) at a boundary of Region 0 (PIP), the transaction video encoder 316 can be configured (1) to provide an increased preference to the intra-coding mode while encoding MBs in or bordering Region 0 (PIP) of the PIP overlay area using the data set, $D_{c0}$ (corresponding to the client video frame), (2) to employ a smaller quantization parameter (i.e., finer quantization) within Region 0 (PIP) of the PIP overlay data, and/or (3) to encode each of such MBs periodically in the intra-coding mode in order to prevent temporal error propagation. As noted herein, any such error propagation is allowed to be present in the video data bitstream provided to the agent device 306, while such error propagation in the video data bitstream provided to the video storage area 318 is preferably avoided.

Because (1) the size of Region 0 (PIP) corresponding to the PIP overlay data is typically small relative to the overall size of the client video frame 104, (2) the data of the client video frame 104 in each of Region 1 (Above) and Region 2 (Below) is encoded once and sharingly used, as is, in the data bitstreams provided to the agent device 306 and the video storage area 318, (3) some encoding functions are shared in the data bitstreams provided to the agent device 306 and the video storage area 318, with the exception of the entropy encoding functions employed in Region 3 (Left) and Region 4 (Right) of the data of the client video frame 104, and (4) such entropy encoding functions constitute a relatively small amount (e.g., about 10%) of the overall coding complexity, the total number of encoding cycles required in this example to record real-time video transactions between the client device 304 and the agent device 306 can be reduced by up to about 80%.

FIG. 4 depicts an exemplary method of operating the system 300 (see FIG. 3a) for recording real-time video transactions between the client device 304 and the agent device 306, using the PIP format 100a. As depicted in block 402, data associated with a video frame from the client device 304 is received at the transaction video encoder 316. As depicted in block 404, data associated with a PIP video frame originating from the agent device 306 is received at the transaction video encoder 316. As depicted in block 406, the data associated with the video frame from the client device 304 is encoded by the transaction video encoder 316. As depicted in block 408, an encoded video data bitstream is provided to the agent device 306 for viewing of the video frame from the client device 304 at the agent device 306. As depicted in block 410, the data associated with the PIP video frame originating from the agent device 306 is encoded by the transaction video encoder 316, the PIP video frame being partially overlaid on top of the video frame from the client device 304. As depicted in block 412, an encoded video frame/PIP overlay data bitstream is provided to the video storage area 318 for storage in a video file within the video storage area 318.

FIG. 5 depicts an illustrative embodiment of an exemplary system 500 for recording real-time video transactions between computerized user devices using the side-by-side picture format 100b of FIG. 1b or the above-and-below picture format 100c of FIG. 1c, in accordance with the present application. As shown in FIG. 5, the system 500 includes a client device 504, an agent device 506, and a transaction server 502 communicably coupled between the client device 504 and the agent device 506. As in the system 300 of FIG. 3a, one or both of the client device 504 and the agent device 506 in the system 500 (see FIG. 5) can communicate with the transaction server 502 over at least one network, such as the Internet. Further, one or both of the agent device 506 and the transaction server 502 can be located within a call center of a customer service organization (e.g., insurance, banking), or any other suitable location where real-time video transactions may be handled. The transaction server 502 includes a video decoder 512, a video encoder 514, and a transaction video generator 516. The video decoder 512 is operative to receive, from the agent device 506, a first video bitstream corresponding to at least one agent video frame, such as the agent video frame 102b (see FIG. 1b) or the agent video frame 102c (see FIG. 1c) (e.g., a YUV frame), to decode the first video bitstream to obtain data of the agent video frame 102b or 102c, and to provide the data of the agent video frame 102b or 102c to the video encoder 514. For example, the agent video frame 102b or 102c from the agent device 506 can include the image 106 of the agent. The video encoder 514 is operative to encode the data of the agent video frame 102b or 102c, and to provide the encoded data of the agent video frame 102b or 102c to the client device 504 for viewing of the agent video frame 102b or 102c by the client. The video encoder 514 is further operative to generate MB data (e.g., MB coding mode(s), intraframe prediction mode(s), motion vector(s), quantization parameter(s), quantized coefficient(s)) of the agent video frame 102b or 102c during the encoding process, and to provide the MB data of the agent video frame 102b or 102c to the transaction video generator 516.

The transaction server 502 further includes a video decoder 508, a video encoder 510, and a video storage area 518. The video decoder 508 is operative to receive, from the client device 504, a second video bitstream corresponding to at least one client video frame, such as the client video frame 104b (see FIG. 1b) or the client video frame 104c (see FIG. 1c) (e.g., a YUV frame), to decode the second video bitstream to obtain data of the client video frame 104b or 104c, and to provide the data of the client video frame 104b or 104c to the video encoder 510. For example, the client video frame 104b or 104c from the client device 504 can include the image 108 of the client. The video encoder 510 is operative to encode the data of the client video frame 104b or 104c, and to provide the encoded data of the client video frame 104b or 104c to the agent device 506 for viewing of the client video frame 104b or 104c by the agent. The video encoder 510 is further operative to generate MB data (e.g., MB coding mode(s), intraframe prediction mode(s), motion vector(s), quantization parameter(s), quantized coefficient(s)) of the client video frame 104b or 104c, and to provide the MB data of the client video frame 104b or 104c to the transaction video generator 516. The transaction video generator 516 is operative to receive, from the respective video encoders 510, 514, information pertaining to at least the slice structure and MB data (e.g., MB coding mode(s), intra-coding mode, inter-coding mode, intraframe prediction mode(s), motion vector(s), quantization parameter(s), and/or quantized coefficient(s)), and to perform entropy encoding on the slice data and the MB data of the agent video frame 102b (see FIG. 1b) or the agent video frame 102c (see FIG. 1c), as well as the slice data and the MB data of the client video frame 104b or 104c, using at least some of the received information. It is noted that the video encoder 510 can encode the data of the client video frame 104b or 104c such that, when the transaction video generator 516 performs such entropy encoding, none of the received information pertaining to the agent video frame 102b or 102c is used in the processing of the client video frame 104b or 104c, and vice versa. For example, the video encoders 510, 514 can perform a motion search to acquire motion vectors for macroblocks (MBs) in one of the agent and client video frames 102b (or 102c), 104b (or 104c), without pointing to any area of the other video frame in the side-by-side picture format 100b, or in the above-and-below picture format 100c. The transaction video generator 516 is operative to arrange the MB data of the agent video frame 102b or 102c and the MB data of the client video frame 104b or 104c such that the respective agent and client video frames 102b and 104b appear side-by-side in the combined video frame 101 (see FIG. 1b), and the respective agent and client video frames 102c and 104c appear one video frame above the other video frame in the combined video frame 103 (see FIG. 1c), to perform the entropy encoding of the arranged MB data of the agent video frame 102b or 102c and the client video frame 104b or 104c, and to provide a combined video frame data bitstream for storage in a video file within the video storage area 518.

The operation of the system 500 will be further understood with reference to the following illustrative example, as well as FIGS. 1b, 1c, and 5. As described herein, the transaction video generator 516 (see FIG. 5) is operative to receive, from the respective video encoders 510, 514 (see also FIG. 5), information pertaining to at least the slice structure and MB data (e.g., MB coding mode(s), intra-coding mode, inter-coding mode, intraframe prediction mode(s), motion vector(s), quantization parameter(s), and/or quantized coefficient(s)), and to perform entropy encoding on the data of the agent video frame 102b (see FIG. 1b) or the agent video frame 102c (see FIG. 1c) and the data of the client video frame 104b (see also FIG. 1b) or the client video frame 104c (see also FIG. 1c), using at least some of the received information.

In this example, so that the transaction video generator 516 can perform such entropy encoding on the data of the agent video frame 102b or 102c and the data of the client video frame 104b or 104c, the video encoders 510, 514 can generate a set of MB data, $R_i$, for a real-time video transaction between the client device 504 and the agent device 506. Such a data set, $R_i$, can be expressed, as follows:

$$R_i = \{D_{i,k} | i=1,2 \text{ and } k=0,1,\ldots,K_i-1\}, \quad (5)$$

in which "$D_{2,k}$" (i=2) corresponds to an MB in the data of the agent video frame 102b or 102c (including the agent's image 106), "$D_{1,k}$" (i=1) corresponds to an MB in the data of the client video frame 104b or 104c (including the client's image 108), "$K_2$" (i=2) corresponds to the total number of MBs in the data of the agent video frame 102b or 102c, and "$K_1$" (i=1) corresponds to the total number of MBs in the data of the client video frame 104b or 104c. The data, $D_{i,k}$, can include at least the slice structure and MB data (e.g., MB coding mode(s), intra-coding mode, inter-coding mode, intraframe prediction mode(s), motion vector(s), quantization parameter(s), and/or quantized coefficient(s)) for the corresponding MB.

Using the data set, $R_2$ (i=2), for the agent video frame 102b (see FIG. 1b) or the agent video frame 102c (see FIG. 1c), and the data set, $R_1$ (i=1), for the client video frame 104b (see also FIG. 1b) or the client video frame 104c (see also FIG. 1c), the transaction video generator 516 can arrange the agent video frame 102b or 102c and the client video frame 104b or 104c such that the respective agent and client video frames 102b and 104b appear side-by-side in the combined video frame 101 (see FIG. 1b), or the respective agent and client video frames 102c and 104c appear one video frame above the other video frame in the combined video frame 103 (see FIG. 1c). The transaction video generator 516 can then provide a combined video frame data bitstream in the side-by-side picture format 100b or the above-and-below picture format 100c for storage in a video file within the video storage area 518.

As described herein, the video encoder 510 is operative to encode the data of the client video frame 104b (see FIG. 1b) or the client video frame 104c (see FIG. 1c), and to provide the MB data of the client video frame 104b or 104c to the transaction video generator 516. Likewise, the video encoder 514 is operative to encode the data of the agent video frame 102b (see also FIG. 1b) or the agent video frame 102c (see also FIG. 1c), and to provide the MB data of the agent video frame 102b or 102c to the transaction video generator 516. The transaction video generator 516 is configured to maintain slice structures created by the video encoder 510 and the video encoder 514. In the case of the side-by-side picture format 100b, the following criteria are therefore maintained for encoding video frame data using the H.264 coding method: (1) each slice includes MBs in the same raster scan line, (2) motion search is performed for each of the agent video frame 102b and the client video frame 104b, without pointing to any area of the other video frame in the side-by-side picture format 100b, (3) intra-prediction encoding is constrained so that it does not use any pixels from the other side of the combined video frame 101, and (4) deblock filtering is performed inside each slice (NAL unit), but not performed across slices (NAL units).

Moreover, in the case of the above-and-below picture format 100c, the following criteria are therefore maintained for encoding video frame data using the H.264 coding method: (1) each slice can include MBs in multiple raster scan lines, (2) motion search is performed for each of the agent video frame 102c and the client video frame 104c, without pointing to any area of the other video frame in the above-and-below picture format 100c, (3) intra-prediction encoding is constrained so that it does not use any pixels from the other side of the combined video frame 103, and (4) deblock filtering is performed inside each slice (NAL unit), as well as across slices (NAL units), with the exception of the last slice (NAL unit) of the video frame in the upper position of the above-and-below picture format 100c and the first slice (NAL unit) of the video frame in the lower position of the above-and-below picture format 100c.

FIG. 6 depicts an exemplary method of operating the system 500 (see FIG. 5) for recording real-time video transactions between the client device 504 and the agent device 506, using the side-by-side picture format 100*b* or the above-and-below picture format 100*c*. As depicted in block 602, macroblock (MB) data associated with a video frame from the client device 504 is received at the transaction video generator 516. As depicted in block 604, MB data associated with a video frame from the agent device 506 is received at the transaction video generator 516. As depicted in block 606, the MB data of the video frame from the client device 504 and the MB data of the video frame from the agent device 506 are arranged, by the transaction video generator 516, such that the respective video frames appear side-by-side or one video frame above the other video frame in a combined video frame. As depicted in block 608, entropy encoding is performed, by the transaction video generator 516, on the arranged MB data of the combined video frame. As depicted in block 610, a combined video frame data bitstream is provided to the video storage area 518 for storage in a video file within the video storage area 518.

It is noted that any other suitable format(s) for recording real-time video transactions between computerized user devices using the systems and methods described herein may be employed in addition to and/or in place of the PIP format 100*a* (see FIG. 1*a*), the side-by-side picture format 100*b* (see FIG. 1*b*), and/or the above-and-below picture format 100*c* (see FIG. 1*c*).

It is further noted that the operations herein described are purely exemplary and imply no particular order. Further, the operations can be used in any sequence when appropriate and can be partially used. With the above illustrative embodiments in mind, it should be understood that the above-described systems and methods could employ various computer-implemented operations involving data transferred or stored in computer systems. These operations are those requiring physical manipulation of physical quantities. Usually, though not necessarily, these quantities take the form of electrical, magnetic, or optical signals capable of being stored, transferred, combined, compared, and/or otherwise manipulated.

Moreover, any of the operations described herein that form part of the above-described systems and methods are useful machine operations. The above-described systems and methods also relate to a device or an apparatus for performing such operations. The apparatus can be specially constructed for the required purpose, or the apparatus can be a general-purpose computer selectively activated or configured by a software program stored in the computer. In particular, various general-purpose machines employing one or more processors coupled to one or more computer readable media can be used with software programs written in accordance with the teachings herein, or it may be more convenient to construct a more specialized apparatus to perform the required operations.

The above-described systems and methods can also be embodied as computer readable code on a computer readable medium. The computer readable medium is any data storage device that can store data, which can be thereafter be read by a computer system. Examples of such computer readable media include hard drives, read-only memory (ROM), random-access memory (RAM), CD-ROMs, CD-Rs, CD-RWs, magnetic tapes, and other optical and non-optical data storage devices. The computer readable media can also be distributed over a network-coupled computer system so that the computer readable code is stored and executed in a distributed fashion.

It will be appreciated by those of ordinary skill in the art that modifications to and variations of the above-described systems and methods may be made without departing from the inventive concepts disclosed herein. Accordingly, the invention should not be viewed as limited except as by the scope and spirit of the appended claims.

What is claimed is:

1. A method of storing a real-time video transaction between a client device and an agent device, comprising:
   receiving a client video frame from the client device, the client video frame including client video frame data;
   receiving an agent video frame from the agent device, the agent video frame including agent video frame data;
   encoding the agent video frame data for transmission in real-time to the client device;
   resizing a predetermined area of the agent video frame to obtain a resized agent video frame, the resized agent video frame including agent overlay data;
   overlaying the agent overlay data on top of the client video frame data;
   encoding the client video frame data with the agent overlay data for storage in a same video file; and
   reusing at least the encoded client video frame data for transmission of at least the encoded client video frame data in real-time to the agent device.

2. The method of claim 1 wherein the reusing of at least the encoded client video frame data includes reusing the encoded client video frame data with the agent overlay data for transmission of the encoded client video frame data with the agent overlay data in real-time to the agent device.

3. The method of claim 1 wherein the client video frame data overlaid with the agent overlay data includes a plurality of data regions, the plurality of data regions including a first data region positioned graphically above the agent overlay data, a second data region positioned graphically below the agent overlay data, a third data region positioned graphically to the left of the agent overlay data, and a fourth data region positioned graphically to the right of the agent overlay data, and wherein the encoding of the client video frame data with the agent overlay data includes:
   encoding the first data region of the client video frame data to obtain first client video frame data; and
   encoding the second data region of the client video frame data to obtain second client video frame data.

4. The method of claim 3 wherein the encoding of the client video frame data for transmission to the agent device includes incorporating the first client video frame data and the second client video frame data into the encoded client video frame data for transmission to the agent device.

5. The method of claim 4 wherein the encoding of the client video frame data with the agent overlay data includes:
   encoding the client video frame data with the agent overlay data to obtain encoded client video frame/agent overlay data; and
   incorporating the first client video frame data and the second client video frame data into the encoded client video frame/agent overlay data for storage in the same video file.

6. The method of claim 3 wherein the plurality of data regions further include a fifth data region corresponding to each of the agent overlay data and an overlaid portion of the client video frame data, and wherein the encoding of the client video frame data with the agent overlay data further includes:
   forming a first data set containing one or more macroblocks from the fifth data region corresponding to the agent overlay data; and forming a second data set containing one or more macroblocks from the fifth data region corresponding to the client video frame data.

7. The method of claim 6 further comprising:
forming a third data set containing one or more macroblocks from the third data region of the client video frame data; and
forming a fourth data set containing one or more macroblocks from the fourth data region of the client video frame data.

8. The method of claim 7 wherein the encoding of the client video frame data with the agent overlay data includes:
performing entropy encoding on the first data set, the third data set, and the fourth data set; and
incorporating the entropy encoded first data set, the entropy encoded third data set, and the entropy encoded fourth data set into the encoded client video frame/agent overlay data for storage in the same video file.

9. The method of claim 8 wherein the encoding of the client video frame data for transmission to the agent device includes:
performing entropy encoding on the second data set, the third data set, and the fourth data set; and
incorporating the entropy encoded second data set, the entropy encoded third data set, and the entropy encoded fourth data set into the encoded client video frame data for transmission to the agent device.

10. The method of claim 9 wherein the performing of entropy encoding on the third data set and the fourth data set includes sharing, between the encoded client video frame/agent overlay data for storage in the same video file and the encoded client video frame data for transmission to the agent device, macroblock data associated with the third data region and the fourth data region of the client video frame data.

11. A system for storing a real-time video transaction between a client device and an agent device, comprising:
a video transaction server operative:
to receive a client video frame from the client device, the client video frame including client video frame data;
to receive an agent video frame from the agent device, the agent video frame including agent video frame data;
to encode the agent video frame data for transmission in real-time to the client device;
to resize a predetermined area of the agent video frame to obtain a resized agent video frame, the resized agent video frame including agent overlay data;
to overlay the agent overlay data on top of the client video frame data;
to encode the client video frame data with the agent overlay data for storage in a same video file; and
to reuse at least the encoded client video frame data for transmission of at least the encoded client video frame data in real-time to the agent device.

12. The system of claim 11 wherein the video transaction server is further operative:
to reuse the encoded client video frame data with the agent overlay data for transmission of the encoded client video frame data with the agent overlay data in real-time to the agent device.

13. A method of storing a real-time video transaction between a client device and an agent device, comprising:
receiving a client video frame from the client device, the client video frame including client video frame data;
encoding the client video frame data for transmission in real-time to the agent device, the encoding of the client video frame data including obtaining client macroblock data, the client macroblock data including one or more of macroblock coding mode data, intra-coding mode data, inter-coding mode data, intra-frame prediction mode data, motion vector data, quantization parameter data, and quantized coefficient data associated with the client video frame;
receiving an agent video frame from the agent device, the agent video frame including agent video frame data;
encoding the agent video frame data for transmission in real-time to the client device, the encoding of the agent video frame data including obtaining agent macroblock data, the agent macroblock data including one or more of macroblock coding mode data, intra-coding mode data, inter-coding mode data, intra-frame prediction mode data, motion vector data, quantization parameter data, and quantized coefficient data associated with the agent video frame;
arranging the client macroblock data and the agent macroblock data to form a macroblock data arrangement in a combined video frame in which the client video frame and the agent video frame appear adjacent to one another; and
performing entropy encoding on the macroblock data arrangement in the combined video frame for storage in a same video file.

14. The method of claim 13 wherein the arranging of the client macroblock data and the agent macroblock data includes arranging the client macroblock data and the agent macroblock data to form the macroblock data arrangement in which the client video frame and the agent video frame appear horizontally side-by-side.

15. The method of claim 13 wherein the arranging of the client macroblock data and the agent macroblock data includes arranging the client macroblock data and the agent macroblock data to form the macroblock data arrangement in which the client video frame and the agent video frame appear vertically side-by-side.

16. A system for storing a real-time video transaction between a client device and an agent device, comprising:
a video transaction server operative:
to receive a client video frame from the client device, the client video frame including client video frame data;
to encode the client video frame data for transmission in real-time to the agent device and for obtaining client macroblock data, the client macroblock data including one or more of macroblock coding mode data, intra-coding mode data, inter-coding mode data, intra-frame prediction mode data, motion vector data, quantization parameter data, and quantized coefficient data associated with the client video frame;
to receive an agent video frame from the agent device, the agent video frame including agent video frame data;
to encode the agent video frame data for transmission in real-time to the client device and for obtaining agent macroblock data, the agent macroblock data including one or more of macroblock coding mode data, intra-coding mode data, inter-coding mode data, intra-frame prediction mode data, motion vector data, quantization parameter data, and quantized coefficient data associated with the agent video frame;

to arrange the client macroblock data and the agent macroblock data to form a macroblock data arrangement in a combined video frame in which the client video frame and the agent video frame appear adjacent to one another; and to perform entropy encoding on the macroblock data arrangement in the combined video frame for storage in a same video file.

17. The system of claim 16 wherein the video transaction server is further operative:

to arrange the client macroblock data and the agent macroblock data to form the macroblock data arrangement in which the client video frame and the agent video frame appear horizontally side-by-side.

18. The system of claim 16 wherein the video transaction server is further operative to arrange the client macroblock data and the agent macroblock data to form the macroblock data arrangement in which the client video frame and the agent video frame appear vertically side-by-side.

* * * * *